United States Patent [19]

Wihlborg

[11] Patent Number: 4,725,817

[45] Date of Patent: Feb. 16, 1988

[54] PRESSURE RESPONSIVE PANEL

[75] Inventor: Nils Wihlborg, Helsingborg, Sweden

[73] Assignee: Tecator AB, Höganäs, Sweden

[21] Appl. No.: 759,346

[22] Filed: Jul. 26, 1985

[30] Foreign Application Priority Data

Aug. 9, 1984 [SE] Sweden .............................. 8404040

[51] Int. Cl.$^4$ ................................................ G06F 3/03
[52] U.S. Cl. ............................. 340/365 R; 340/365 S;
200/159 B; 200/5 A; 377/17
[58] Field of Search ........... 340/365 R, 365 S, 365 A,
340/870.31, 870.37, 870.38, 711, 712; 200/5 A,
159 B; 377/5, 6, 17, 18

[56] References Cited

U.S. PATENT DOCUMENTS

| | | | |
|---|---|---|---|
| 3,120,583 | 2/1964 | Cornell | 340/365 A |
| 3,627,935 | 12/1971 | Spievak | 340/365 A |
| 3,818,153 | 6/1974 | Arvai | 200/159 B |
| 4,121,204 | 10/1978 | Welch et al. | 340/712 |
| 4,242,676 | 12/1980 | Piguet et al. | 340/712 |
| 4,386,347 | 5/1983 | Cutler et al. | 340/712 |
| 4,451,714 | 5/1984 | Eventoff | 200/5 |
| 4,494,110 | 1/1985 | Wakeling et al. | 340/365 R |
| 4,575,601 | 3/1986 | Taguchi et al. | 340/365 S |
| 4,621,178 | 11/1986 | Taguchi et al. | 340/365 A |

Primary Examiner—John W. Caldwell, Sr.
Assistant Examiner—Alvin Oberley
Attorney, Agent, or Firm—Shapiro and Shapiro

[57] ABSTRACT

An instrument adapted to make assessments in sensory evaluation comprises two wafers which are separated by spacers and are provided on their opposing faces with conductive patterns. Upon use, the instrument is connected to a computer which activates one conductor at a time on one side of the instrument and senses if one or more of the conductors on the other side of the instrument are activated, i.e. if a person is exerting a pressure, for example by a finger, at some point or other on the instrument. The special design of the conductive patterns makes it possible to convert the analog position of the pressure into a digital signal which is fed directly into the computer.

8 Claims, 4 Drawing Figures

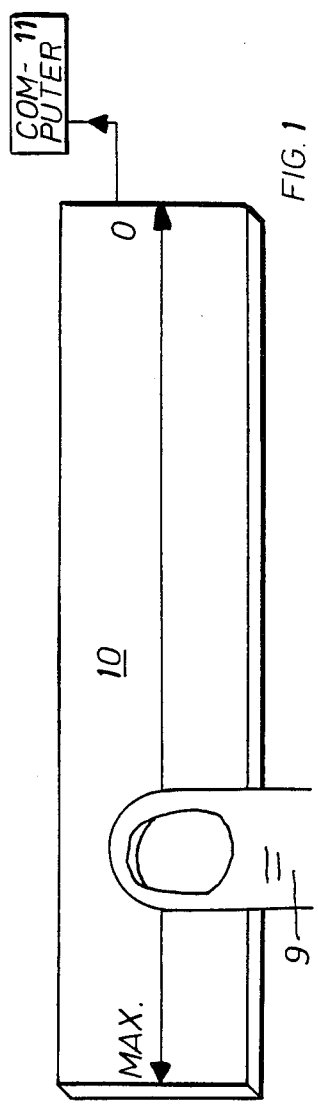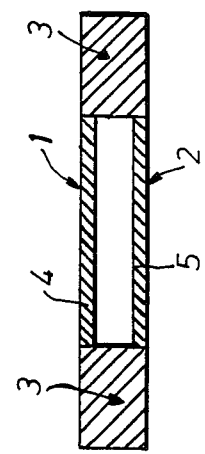

PRESSURE RESPONSIVE PANEL

The present invention relates to an instrument for recording, as a digital signal, an analog position indication made along a distance, said instrument being intended especially for making assessments in connection with tests and comprising two spaced apart wafers having a first and a second conductor, respectively, which are disposed along said distance and can be brought into contact with one another. The invention also provides a method of recording, as a digital signal, an analog position indication by means of a first conductor having conductor sections perpendicular to the direction in which the position indication is made, and second conductors disposed opposite said conductor sections, said first conductors and at least one of said second conductors being brought into contact with one another upon position indication.

In current sensory evaluation methodology, the test persons make their assessments in a very simple manner, for example by ticking off boxes with different text, such as excellent, good ..., disagreeable, or by marking the products on a scale of, for example, from 1 to 9, or in a ranking order. This technique suffers from the disadvantage that, when the results are to be analyzed, they must be fed into a computer, which is time-consuming and, furthermore, may be a source of error.

It therefore would be desirable, in sensory evaluation, to have access to an instrument by means of which an assessment can be made and automatically transferred to a computer in computer-readable form. Such an instrument must be easy to operate and to clean. Furthermore, it should be possible to make the assessment in a "neutral" manner, i.e. the design of the instrument and the assessment technique must not affect the test result.

It therefore is an object of the present invention to provide an instrument for recording an analog assessment as a digital signal that can be interpreted by a computer. Another object of the invention is to provide a method of converting the analog assessment into a digital signal.

These objects of the invention are achieved by means of the characteristic features stated in the appended claims.

A preferred form of the invention will be described below, reference being had to an embodiment illustrated in the accompanying drawings.

In the drawings

FIG. 1 is a front view of how the invention appears to the test person;

FIG. 2 is an enlarged cross-sectional view of a part of the invention;

As will appear from FIG. 1, the instrument comprises a rectangular elongate thin panel 10 which may be connected to a computer 11. During use, the instrument functions as a scale on which the positions of the shorter sides represent the extreme scale values, for example very sour and not at all sour, good and disagreeable, or 0 and 100%. The test person makes his assessment by pressing his finger on the point on the scale corresponding to his assessment of the test product. As will be explained later in detail, the design of the instrument 10 is such that the assessment may be interpreted directly by the computer 11, whereby all time-consuming keying-in of the test results is avoided. The instrument may be mounted in a terminal (not shown) on which different test data are displayed.

Figure 3:
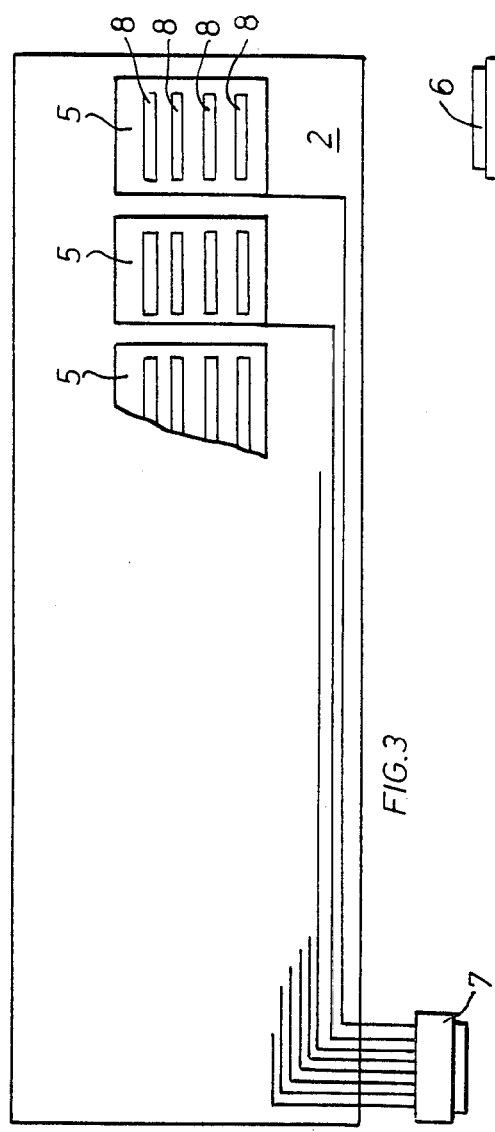
FIG. 3 is a view of the instrument according to the present invention as seen from below.
Figure 4:
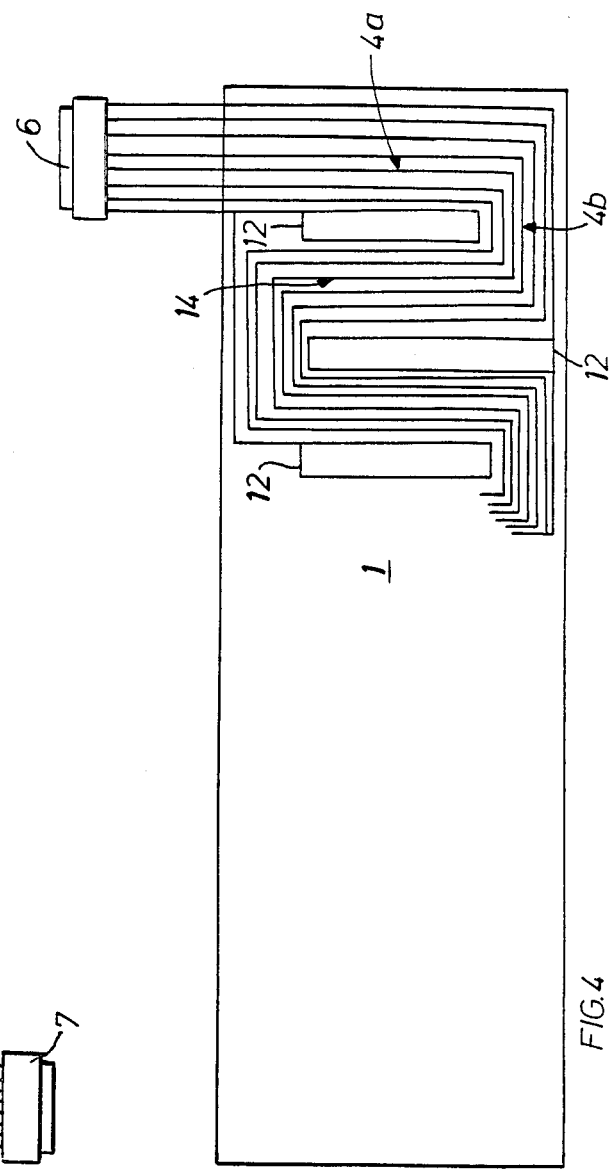
FIG. 4 is a view of the instrument as seen from above.

The construction of the instrument will be described below, reference being had to FIGS. 2-4. The instrument comprises, in per se known manner, two wafers 1, 2 which are separated from one another by spacer means 3 and are provided on their opposing faces with conductors 4, 5 preferably made of silver. The conductors 4, 5 are connected to terminal means 6, 7 which are the input and output, respectively, of the instrument. The wafers 1, 2 are made of plastic and are flexible, such that the conductors can be brought into contact with one another if one of said wafers is subjected to pressure, for example by a finger.

The first wafer 1 (see FIG. 4) has eight conductors 4 extending continuously from the terminal means 6 back and forth across the wafer 1 which thus is covered by conductor sections 4a extending perpendicular to the longitudinal direction of the panel 10 and by conductor sections 4b extending longitudinally of the panel. The individual conductor sections 4a, each extending between two conductor sections 4b or between the beginning/end of a conductor 4 and a conductor section 4b, as shown form groups 14 of conductor sections. Within these groups 14, the conductor sections 4a are parallel and equidistantly spaced apart.

The other wafer 2 (see FIG. 3) also has eight conductors 5 which are connected to the terminal means 7 and located each opposite one group 14 of conductor sections 4a. These conductors are in the form of conductive squares insulated from one another and having a width approximately equal to the width of a group 14 of conductor sections 4a. The conductor squares are spaced equidistantly across the wafer in the longitudinal direction of the panel 10 and, in this embodiment, also are provided with recesses 8. Those sections of the first conductors 4 which extend across the panel opposite the outer edge of a conductor square and back across the panel opposite an adjacent outer edge of a neighboring conductor square are, for the sake of simplicity, formed as strips 12 having a width corresponding to the space taken up by two conductors.

Upon use of the instrument, voltage is applied, via the terminal means 7, first to the first conductor square 5, whereupon the binary states of the first conductors are sensed successively via the terminal means 6. If none of the first conductors 4 is alive, the next conductor square 5 is made alive, and the binary states of the first conductors 4 are again sensed. This procedure, conducted by the computer 11, is repeated until a voltage is sensed on any of the first conductors 4, or until all conductor squares 5 have been alive.

A voltage will be sensed on the first conductors 4 when one or more of the conductor sections 4a opposite the conductor square 5 which at the time has been made alive, are subjected to pressure, for example by a finger 9, and brought into contact with the conductor square. The result is a short-circuiting, and voltage will be sensed on those of the first conductors 4 which are short-circuited, the digital signal being formed by the binary number which is the sum of the number of sensings that have been made of the binary states of the first conductors 4. In this manner, a digital signal is obtained which corresponds to the position of the conductor 4 first depressed (more specifically, to the conductor section 4a which is in contact with the live conductor square 5).

In the majority of cases, however, one is more interested in a digital signal corresponding to the mean value of the position of the depressed conductors 4. The mean value can be obtained by continued scanning, after a voltage has been sensed on any of the first conductors, until a conductor is again sensed which is not alive. The digital signal is then formed by the sum of the said digital signal and the binary number which is half the sum of the further number of sensings that have been made of the binary states of the first conductors. Put another way, the digital signal representing the mean value 4 will be formed by the sum of (1) the total number of sensings having been made when the first depressed conductor section 4a is detected and (2) one half of the additional number sensings made until a non-depressed conductor section is again detected. In other words, the size of the finger or object exerting the pressure will be immaterial.

Summing-up of the number of sensings of the binary states of the first conductors 4 to detect the first depressed section 4a and the further number of sensings to obtain the mean value can be made by incrementing a counter by one or a half unit, respectively, upon sensing of the said conductors 4, or by means of suitable circuit, such as a keyboard decoder.

An instrument of the type described above has many advantages. Production costs stay low, it is simple to operate and has a long life (at least $10_7$ depressions) and it is indifferent to any soil adhering to it during sensory evaluation tests.

The described embodiment of the invention is, of course, but an example, and many modifications and changes may be made within the scope of the appended claims. Naturally, the instrument may comprise a greater of lesser number of conductors and may also be made of other materials. Determining the position of the depression may be made inversely, i.e. by supplying voltage to the first conductors 4 in succession, and by sensing the conductor squares 5. The instrument may also be used for other tasks in sensory evaluation, such as a for indicating the luminous intenseity of continuously adjustable lamps.

What I claim and desire to secure by Letters Patent is:

1. An instrument for use in recording, as a digital signal, an analog position indication made along a line of the instrument between two reference points spaced along said line by a distance substantially greater than the width of a finger, comprising two normally spaced wafers carrying a plurality of first conductors disposed along said line and a plurality of second conductors disposed along said line, respectively, on facing surfaces of said wafers, characterized in that said first conductors extend continuously along said line and form series-connected groups of conductor sections from the different first conductors, which groups extend alternately substantially perpendicular to and substantially parallel to said line, the perpendicularly extending groups collectively span substantially the entire distance between said reference points, the individual conductor sections extending perpendicular to said line are parallel and disposed respectively in positions spaced along said line at equal intervals which are small in comparison to the width of a finger, said second conductors have respective portions each disposed opposite a corresponding one perpendicularly extending group of conductor sections and configured and arranged such that it may be brought into contact with every one of the conductor sections of the corresponding group, at least one of said wafers is flexibly displaceable toward the other continuously along said line by finger pressure between said reference points, and said first and second conductors are arranged such that regardless of where said pressure is applied between said reference points along said line, an underlying first-conductor section will make contact with the corresponding second-conductor portion.

2. Apparatus for use in recording an analog position indication as a digital signal in sensory evaluation and the like, comprising a pressure responsive panel including two normally spaced wafers with opposed conductor-carrying surfaces, at least one of said wafers having an exposed surface along which position indications may be made by finger pressure and being flexibly displaceable toward the other wafer continuously along a line by said finger pressure between two reference points spaced along said line at a distance substantially greater than the width of a finger, one of said conductor-carrying surfaces carrying a plurality of first conductors having conductor sections disposed along said line over substantially the entire distance between said reference points in successive groups of conductor sections from the different first conductors, with the individual conductor sections being respectively disposed in positions regularly spaced along said line at intervals which are small in comparison to the width of a finger, the other of said conductor-carrying surfaces carrying a plurality of second conductors each having a conductor portion disposed opposite a corresponding group of conductor sections and configured and arranged for making electrical contact with every one of the conductor sections of said corresponding group, said conductor sections of said first conductors and said conductor portions of said second conductors being arranged such that regardless of where said finger pressure is applied along said line between said reference points to displace said one wafer toward said other wafer, an underlying first-conductor section will make contact with the corresponding second-conductor portion.

3. Apparatus according to claim 2, including computer means for applying voltages to one of said pluralities of conductors, for sensing the voltage states of the other of said pluralities of conductors to determine a position along said line where said first conductors and said second conductors have been brought into contact with one another, and for recording a digital signal respresentative of said position.

4. Apparatus according to claim 3, wherein said position is the mean position of contact of said conductor sections and said conductor portions.

5. Apparatus according to claim 3, wherein said computer means is operable to apply a voltage to one of said second conductors, to sense the voltage state of each first conductor in succession, to repeat the last-two-mentioned operations until the applied voltage is sensed on one of said first conductors, and to record a digital signal formed by the total number of sensings made when the applied voltage is first sensed.

6. Apparatus according to claim 5, wherein said computer means is operable to repeat said two operations until said applied voltage is no longer sensed and to record a digital signal formed by the sum of said total number of sensings and one-half the additional number of sensing made before said applied voltage is no longer sensed.

7. A method of recording, as a digital signal, an analog position indication by means of a plurality of first conductors having conductor sections oriented perpendicular to a line along which the position indication is made and arranged at regularly spaced positions along said line in successive groups of conductor sections from the different first conductors, and a number of second conductors each having a respective conductor portion disposed opposite a corresponding group of conductor sections such that the conductor portion may be brought into electrical contact with every conductor section of that group, a conductor section of at least one first conductor and a conductor portion at least of one second conductor, both corresponding to the location of said position indication, being brought into electrical contact with one another upon said position indication, characterized by the steps of:

(a) applying a voltage to one of the second conductors;

(b) sensing the voltage state of each first conductor in succession;

(c) repeating steps (a) and (b) until the applied voltage is sensed on one of the first conductors; and (d) recording a digital signal formed by the binary number which is the sum of the number of sensing that have been made when the applied voltage is first sensed, said sum representing the location of said position indication along said line.

8. A method according to claim 7, characterized in that steps (a) and (b) are repeated after the applied voltage is first sensed, until a conductor is detected on which the applied voltage is not sensed, and including the step of recording a digital signal formed of the binary number composed of the aforesaid sum plus one-half the sum of the further number of sensings made before the applied voltage is no longer sensed.

* * * * *